United States Patent [19]

Sampson et al.

[11] 4,126,481
[45] Nov. 21, 1978

[54] DRAG REDUCING WAX

[75] Inventors: Ronald N. Sampson, Murrysville, Pa.; Harold O. McCaskey, Allendale, S.C.

[73] Assignee: Westinghouse Electric Corp., Pittsburgh, Pa.

[21] Appl. No.: 733,594

[22] Filed: Oct. 18, 1976

[51] Int. Cl.² .............................................. C08L 1/08
[52] U.S. Cl. ................................ 106/191; 106/197 C; 106/270; 260/28.5 R
[58] Field of Search ................. 106/10, 191, 270, 230, 106/193 C, 207, 197 C; 260/28.5 R

[56] References Cited

U.S. PATENT DOCUMENTS

| 3,266,915 | 8/1966 | Faulkner et al. | 106/38.8 |
| 3,519,562 | 7/1970 | Lanner | 252/8.8 |
| 3,532,532 | 10/1970 | Berman | 106/230 |
| 3,787,345 | 1/1974 | Dickman et al. | 106/230 |
| 3,997,674 | 12/1976 | Ukai et al. | 426/90 |

FOREIGN PATENT DOCUMENTS 29,760  9/1970  Japan ........................................ 106/230

Primary Examiner—Lorenzo B. Hayes
Attorney, Agent, or Firm—D. P. Cillo

[57] ABSTRACT

A wax composition, useful as a ski wax is made, comprising a rigid wax matrix, and from about 3 wt.% to about 45 wt.% of a thermoplastic, water soluble polymer disposed within the wax matrix. The ski wax provides a surface where the water soluble polymer will be leached out of the rigid wax matrix upon contact with water, to provide a boundary lubricant film.

6 Claims, No Drawings

DRAG REDUCING WAX

BACKGROUND OF THE INVENTION

Ski running surfaces made from polyethylene, epoxy, polyurethane, polyvinylalcohol, polyvinylchloride, polypropylene and polytetrafluoroethylene plastics, are well known and taught by Kennedy in U.S. Pat. Nos. 3,272,522 and 3,416,810. The running surface may contain a lubricating filler such as powdered graphite or molybdenum disulfide. This outer surface is generally bonded to the ski body, which may be a solid polymeric foam, with a catalyzed adhesive impregnated Dacron, fiberglass or cotton cloth reinforcement.

While such particulate lubricant inclusion helps to reduce drag between the ski running surface and the snow, the spaced apart particles do not provide a continuous lubricating surface. They also tend to easily wear off the ski surface due to friction with the snow.

Dissel, in U.S. Pat. No. 2,494,531, in attempting to solve ski drag problems, taught a combination lacquer-wax, containing bayberry or paraffin wax, nitrocellulose, and the calcium salt of dioctyl-succinic acid. This provided a very adherent, easily replaceable wax, having a very low coefficient of friction, which could be easily applied to the running surfaces of a ski.

In a related area, Beard, in U.S. Pat. No. 3,785,841, taught a wax combination, containing paraffin wax and ethyl cellulose or an oleyl amide resin. This provided a very adherent wax, that was moisture repellent, had a low adhesion to snow, and was particularly useful on snow shovels.

What is needed is a wax that will provide a continuous, frictionless surface upon contact with water.

SUMMARY OF THE INVENTION

The above need is met by providing a wax composition, especially suitable for use on skis, comprising a rigid wax matrix which is not water soluble, and is effective to adhere to the ski bottom and remain adherent and a hard solid, without melting, at up to about 10° C.; and from about 3 wt.% to about 45 wt.% of a thermoplastic, water soluble polymer disposed within the wax matrix. The water soluble polymer is preferably selected from polyacrylamide, carboxy methyl cellulose, sodium carboxy methyl cellulose, polysaccharide, guar gum, vinyl pyridine, poly(ethylene oxide) and their mixtures. The wax is effective to provide a surface on the ski bottom wherein the water soluble polymer will be leached out of the rigid wax matrix upon contact with water, to provide a boundary lubricant between the wax and the snow, ice or water.

DESCRIPTION OF THE PREFERRED EMBODIMENTS

Skis are generally made by a sandwich construction, wherein the top surface, sidewall, and a bonded, bottom, ski running surface base cover reinforcing layers, which may comprise fiberglass, Dacron, rayon or cotton cloth, used alone or impregnated with epoxy, polyester or other suitable adhesive resin. On the sides of the reinforcing layers, aluminum edge protectors may be provided. A core, which is highly flexible in high performance skis, can be a hollow or solid plastic core of epoxy resin reinforced fiberglass, a lightweight epoxy, polystyrene or polyurethane foam or an aluminum honeycomb, is surrounded by a top surface layer, a bottom ski surfacing base layer and sidewalls between the top surface and base.

The wax of this invention is particularly useful on ultra-high high performance skis, and is applied directly, as an exterior coating, to the ski running surface base layer that will come into direct friction contact with snow. The ski base layer can comprise epoxy resin, polyurethane resin, melamine resin, polyvinyl alcohol resin, polyvinyl chloride resin, polypropylene resin, polytetrafluoroethylene resin, polyester resin, polyethylene resin, and wood.

The ski wax of this invention will contain from about 3 wt.% to about 45 wt.% and preferably about 5 wt.% to about 35 wt.% of a long carbon chain, thermoplastic water soluble polymer disposed and interspersed within the non-water soluble wax matrix. This polymer will slowly dissolve and be leached out of its surrounding wax matrix upon contact with the microlayer of water from the snow or ice on which the waxed ski surface moves, to form a liquid polymer containing film. This film acts as a continuous, frictionless, boundary lubricant on the wax surface, to reduce drag and increase the speed of travel of the ski.

The polymer containing film must provide at least 100 parts of water soluble polymer per 1,000,000 parts of water to provide adequate lubricity. Under about 3 wt.% water soluble polymer and no improvement in lubricity is observed. Over about 45 wt.% water soluble polymer and the ski wax will require too frequent reapplication due to excessive loss of one of its components. When most of the ski wax has been dissolved and lost by friction with the snow, another layer can be easily applied.

The number of carbons per molecule for suitable water soluble polymers will range between about 25 to about 225,000. Useful water soluble polymers include, for example, polyacrylamide $(CH_2CHCONH_2)_n$, carboxy methyl cellulose, sodium carboxy methyl cellulose, polysaccharide (nine or more monosaccharides linked with glycosidic bonds) including guar gum (glactose, mannose and protein), vinyl pyridine and preferably poly(ethylene oxide) polymers. Particularly useful results have been obtained by using polymers of poly(ethylene oxide) having average molecular weights of from 100,000 to 5,000,000. These particulate hydratable polymers may be used alone or in mixtures. The polymers must be capable of being homogeneously mixed with the wax and other materials used in the ski wax.

The other components of the ski wax include the non-water soluble wax itself, which may comprise from about 55 wt.% to about 97 wt.% of the ski wax, and act as a matrix for the water soluble polymer. Useful waxes include bayberry wax, paraffin wax, carnauba wax, montan wax, beeswax, candelilla wax, ozocerite wax, ceresin wax and their mixtures. Any other suitable wax may be used which is not water soluble, and which is effective to adhere to the ski base layer and remain adherent and a hard solid, without melting, at temperatures from about −18° C. to about 10° C., so that the ski wax is effective in dry powdery snow and wet snow. Many waxes are commercially available for specific use under various snow conditions as ski waxes. Effective amounts of suitable binders, stiffeners, dispersing agents, extenders and coloring pigments may also be added to the wax.

EXAMPLE 1

A wax was prepared by melt mixing 95 parts by weight of a paraffin wax; and 5 parts by weight of poly(ethylene oxide), having an average molecular weight of about 4,000,000, at 55° C. until the admixture was homogeneous. The admixture was poured into a mold and refrigerated at 0° C. to form a hard, solid material comprising poly(ethylene oxide) homogeneously disposed and interdispersed in a wax matrix.

Samples were tested for lubricity by rubbing water on the surface. The water dissolved and leached out a quantity of the poly(ethylene oxide). The surface after water addition grew exceedingly slippery and it was evident that lubrication was achieved. Samples of the same wax, without the poly(ethylene oxide) were noticeably less slippery after water addition and surface rubbing.

In a similar fashion the amount of poly(ethylene oxide) was increased to 30 wt.%. The admixture was frozen as above and water applied to the surface of samples which were found to be even more slippery. Both formulations would provide excellent surfacing agents for any type of substrate, and especially for water or snow skis, where friction between the wax and the water, ice or snow would allow dissolution of the water soluble polymer.

Both waxes were rubbed onto melamine resin impregnated, laminated substrates. They were adherent, easy to apply, remained a hard solid, and did not soften at room temperature. Both formulations would be useful under most snow conditions. Other waxes, such as bayberry, montan, beeswax, candelilla, ozicerite and ceresin should give comparable results; and other water soluble polymers, such as polyacrylamide, carboxy methyl cellulose, sodium carboxy methyl cellulose, guar gum, and vinyl pyridine should also provide lubricating qualities.

We claim:

1. A solid wax lubricant composition, consisting essentially of a rigid wax matrix, which will remain a hard solid without melting at temperatures of up to about 10° C., and from about 3 wt.% to about 45 wt.% of a water-soluble thermoplastic polymer selected from the group consisting of polyacrylamide, carboxy methyl cellulose, sodium carboxy methyl cellulose, vinyl pyridine, poly(ethylene oxide) and mixtures thereof disposed within the wax matrix, said solid matrix being effective to allow the polymer to be leached out of the matrix upon contact with water, at a rate of at least 100 parts of polymer per 1,000,000 parts of water, to provide a slippery, boundary lubricant film on the wax surface.

2. The wax composition of claim 1, wherein the water soluble polymer is poly(ethylene oxide).

3. The wax composition of claim 2, wherein the wax is selected from the group consisting of bayberry wax, paraffin wax, carnauba wax, montan wax, beeswax, candelilla wax, ozocerite wax, ceresin wax and mixtures thereof.

4. The wax composition of claim 2, wherein the water soluble polymer is present in the range of from about 5 wt.% to about 35 wt.%.

5. A solid ski wax lubricant composition, consisting of a non-water soluble, rigid wax matrix, which will remain a hard solid without melting at temperatures of from about −18° C. to about 10° C., containing from about 5 wt.% to about 35 wt.% of poly(ethylene oxide) polymer, having an average molecular weight of from 100,000 to 5,000,000, which will slowly dissolve upon contact with water, homogeneously interdispersed within the wax matrix, said solid matrix being effective to allow the poly(ethylene oxide) to be leached out of the matrix upon contact with snow, at the rate of at least 100 parts of polymer per 1,000,000 parts of water in the snow, to provide a polymer containing, slippery, boundary lubricant film.

6. The wax composition of claim 5, wherein the wax is selected from the group consisting of bayberry wax, paraffin wax, carnauba wax, montan wax, beeswax, candelilla wax, ozocerite wax, ceresin wax and mixtures thereof.

* * * * *